(12) United States Patent
Beymer et al.

(10) Patent No.: US 9,064,306 B2
(45) Date of Patent: Jun. 23, 2015

(54) BIDIRECTIONAL BLOOD VESSEL SEGMENTATION

(71) Applicant: International Business Machines Corporation, Armonk, NY (US)

(72) Inventors: David J. Beymer, San Jose, CA (US); Ritwik K. Kumar, San Jose, CA (US); Tanveer F. Syeda-Mahmood, Cupertino, CA (US); Fei Wang, San Jose, CA (US); Yong Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 13/972,052

(22) Filed: Aug. 21, 2013

(65) Prior Publication Data

US 2015/0003697 A1    Jan. 1, 2015

Related U.S. Application Data

(63) Continuation of application No. 13/930,465, filed on Jun. 28, 2013.

(51) Int. Cl.
*G06K 9/00* (2006.01)
*G06T 7/00* (2006.01)
*B41M 5/00* (2006.01)

(52) U.S. Cl.
CPC .............. *G06T 7/0012* (2013.01); *G06T 7/0079* (2013.01)

(58) Field of Classification Search
USPC ......... 382/100, 103, 106–107, 128–134, 154, 382/162, 168, 172–173, 181, 191, 232, 254, 382/260, 274, 291, 305, 312; 378/4, 21, 29; 703/11
See application file for complete search history.

(56) References Cited

U.S. PATENT DOCUMENTS

| 7,492,934 B2* | 2/2009 | Mundy et al. ................. 382/128 |
| 2007/0249912 A1 | 10/2007 | Tek |
| 2008/0249755 A1* | 10/2008 | Tek et al. ........................ 703/11 |
| 2011/0052035 A1* | 3/2011 | Kirchberg et al. ............ 382/132 |
| 2012/0121151 A1* | 5/2012 | Bernhardt et al. ............ 382/131 |

OTHER PUBLICATIONS

Shoujun et al, "Automatic Segmentation of Coronary Angiograms Based on Fuzzy Inference and Probabilistic Tracking", BioMedical Engineering OnLine 2010, 9:40; Aug. 20, 2010; 21 pages.*

(Continued)

*Primary Examiner* — Seyed Azarian
(74) *Attorney, Agent, or Firm* — Cantor Colburn LLP; Libby Toub

(57) ABSTRACT

Embodiments relate to segmenting blood vessels in angiogram images. An aspect includes a method that includes receiving and preprocessing at least one angiogram frame and preprocessing. In one embodiment, at least one angiogram frame is received and preprocessed. Bottom-up filtering of the preprocessed angiogram frame and top-down segmentation of the preprocessed angiogram frame are performed based on the results of the bottom-up filtering. The bottom-up filtering and the top-down segmentation are iteratively repeated until the difference between results of the top-down segmentation from consecutive iterations is equal to or below a threshold value. Based on determining that a difference between results of the top-down segmentation from consecutive iterations is below or equal to the threshold value, the results of the top-down segmentation are outputted.

6 Claims, 3 Drawing Sheets

(56) References Cited

OTHER PUBLICATIONS

Lara, et al, "A Semi-Automatic Method for Segmentation of the Coronary Artery Tree from Angiography," Proceedings of the XXII Brazilian Symposium on Computer Graphics and Image Processing (SIBGRAPI), IEEE, Oct. 11-15, 2009, 7 pages.

Wang, et al, "A Segmentation Method of Coronary Angiograms Based on Multi-Scale Filtering and Region-Growing", 2012 International Conference on Biomedical Engineering and Biotechnology, IEEE Computer Society, May 28-30, 2012, pp. 678-681.

* cited by examiner

BIDIRECTIONAL BLOOD VESSEL SEGMENTATION

This application is a continuation application of the legally related U.S. Ser. No. 13/930,465, filed Jun. 28, 2013, the contents of which are incorporated by reference herein in their entirety.

BACKGROUND

Embodiments of the invention relate generally to automated angiogram analysis, and more specifically, to bidirectional blood vessel segmentation using top-down and bottom-up models.

Cardiac catheterization with coronary angiogram is a test commonly used to check the blood flow in coronary arteries. Physicians use angiograms to grade the severity of coronary artery disease by detecting arterial lesions. An analysis of the number, severity, and location of the lesions guides physicians in choosing between a heart bypass operation or angioplasty. Metrics such as the syntax score have been developed to prospectively characterize the coronary vasculature with respect to the number of lesions and their functional impact, location, and complexity. In general, a higher syntax score is indicative of more complex coronary artery disease that represents a bigger therapeutic challenge.

Typically, angiography image data includes the presence of a non-trivial amount of scanning noise, background clutter (e.g. tissues, vertebra, lungs), as well as large appearance variations across different scanners and patients. Accordingly, accurate localization and quantification of blood vessels reflected in X-ray angiograms, or angiography images, plays a significant role in automatic angiogram analysis.

One blood vessel segmentation in angiograms images, referred to as a top-down approach, uses prior knowledge about the blood vessels, such as shape and intensity, to guide the segmentation. Examples of top-down methods include region growing, active contour, tracking based or supervised learning approaches.

Other known blood vessel segmentations methods, referred to as bottom-up methods, segment the angiogram images into regions based on features such as edges or intensities and then identify regions correspond to the blood vessel. Examples of bottom-up methods include, graph-cut based methods or fitter based methods, such as the morphological filter or multi-scale Hessian filter.

BRIEF SUMMARY

Embodiments include a method for segmenting blood vessels in angiogram images. In one embodiment, at least one angiogram frame is received and preprocessed. Bottom-up filtering of the preprocessed angiogram frames and top-down segmentation of the preprocessed angiogram frames are performed based on the results of the bottom-up filtering. The bottom-up filtering and the top-down segmentation are iteratively repeated until the difference between results of the top-down segmentation from consecutive iterations is equal to or below a threshold value. Based on determining that a difference between results of the top-down segmentation from consecutive iterations is below or equal to the threshold value, the results of the top-down segmentation are outputted.

Additional features and advantages are realized through the techniques of the present disclosure. Other embodiments and aspects of the disclosure are described in detail herein.

For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Embodiments described herein are directed to bidirectional blood vessel segmentation using both top-down and bottom-up models. In exemplary embodiments, a bidirectional vessel segmentation method includes iteratively performing top-down and bottom-up vessel segmentation methods to achieve optimum vessel segmentation. In one embodiment, a Frangi-Radon feature (FRF) is used as the bottom-up filter, which aggregates information derived from both Hessian features as well as the Radon-like feature (RLF). The output of the bottom-up filter is used as the initialization of the top-down segmentor. Likewise, the top-down segmentation results are then input back into bottom-up filter.

Figure 1:
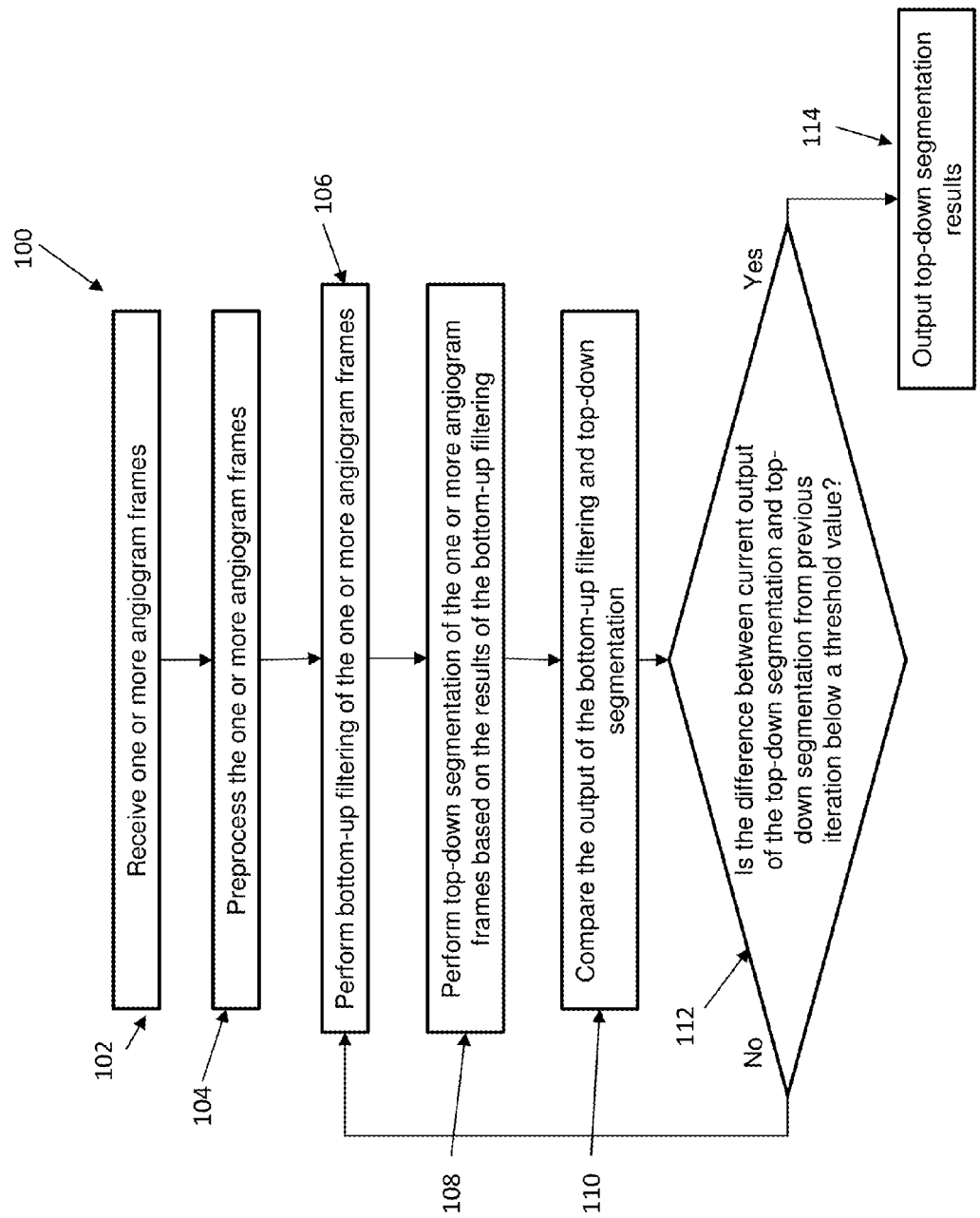
FIG. 1 depicts a process flow for bidirectional blood vessel segmentation in accordance with an embodiment.

Referring now to FIG. 1, a process flow of a method 100 for bidirectional blood vessel segmentation using both top-down and bottom-up models in accordance with an embodiment is illustrated. As illustrated at block 102, the method 100 begins by receiving one or more angiogram frames. Next, as shown at block 104, the method 100 includes preprocessing the one or more angiogram frames. The method 100 also includes performing bottom-up filtering of the one or more angiogram frames, as shown at block 106. Next, as shown at block 108, the method includes performing top-down segmentation of the one or more angiogram frames based on the results of the bottom-up filtering. As shown at block 110, the results of the bottom-up filtering and the top-down segmentation are compared. At decision block 112, if the difference between a current output of the top-down segmentation and top-down segmentation from a previous iteration is below a threshold value, the method 100 proceeds to block 114 and outputs the top-down segmentation results. Otherwise, the method 100 returns to block 106 and the output of the top-down segmentation is input into the bottom-up filter. The method 100 will iteratively alternate between performing the bottom-up filtering and the top-down segmentation until the results of the bottom-up filtering and the top-down segmentation converge, or have a difference which is less that the threshold value.

In exemplary embodiments, the preprocessing of the angiogram frames may include, but is not limited to, detecting one or more regions of interest (ROI) that contains the actual image, adaptive enhancement of the images, and removal of non-arterial shapes such as catheters. In one embodiment, the coordinates of the region of interest can be determined by taking the gradient of the standard deviation of pixel intensities with respect the x and y, the peaks of which will correspond to the coordinates of the bounding box of the region of interest. The preprocessing can include applying a Butterworth bandpass filter to suppress high and low frequency background noise. In one embodiment, the preprocessing also includes contrast enhancement of the angiogram image by transforming the values using contrast-limited adaptive histogram equalization. Once the preprocessing of the angiogram images are complete, the images are the filtered using a bottom-up filtering technique.

Frangi filters are widely used during bottom-up filtering methods for vesselness enhancing filters. Though effective in many cases, Frangi filters often fail to sufficiently enhance cardiac vessels in cases with blurry and noisy vessel boundaries. In general, Frangi filters look at a Hessian matrix at different scales at each pixel, while RLF filters explicitly use the structure surrounding a pixel. RLF filters use texture information explicitly while Frangi filters only use gradient. Accordingly, when edge responses are weak at certain vessel location due to background noise, the RLF filter may result in disconnected branches.

In exemplary embodiments, the bottom-up filter used in block 106 of the method 100 is a Frangi-Radon feature (FRF) filter which is configured to leverage both the texture and the geometric information present in the angiogram images to segment vessels of interest. In FRF, the extraction function which incorporates Frangi vesselness is measured along a particular scanning line, assume $F(L(t,\theta))$ is Frangi filter response along the sampling line L, which is parameterized by t along which features are obtained. The orientation of the line is $\theta$, the new extraction function it is given as, $$T(I(x, y), L(t, \theta)) = \frac{\int_{t_i}^{t_{i+1}} F(L(t, \theta))R(L(t, \theta))}{\|L(t_{i+1}) - L(t_i)\|_2} dt. \quad (1)$$

Where the line segments are defined by a set of salient points called knots $t_i$. The transformation $R(x)$ is defined over the image which captures response of the most dominant GSD (Gaussian-Second-Derivative) filter at each pixel. The extraction function assigns all the pixels between the knots $t_i$ and $t_{i+1}$ along the line L the mean value of the function R between the same two knots. The Frangi filter in this formulation acts as a weighting factor to the Radon-like feature. Accordingly, the RLF features along different directions will be weighed differently as the Frangi filter response changes. Therefore, the RLF can be heavily weighted along those directions that Frangi filter gave large response.

Figure 2A:
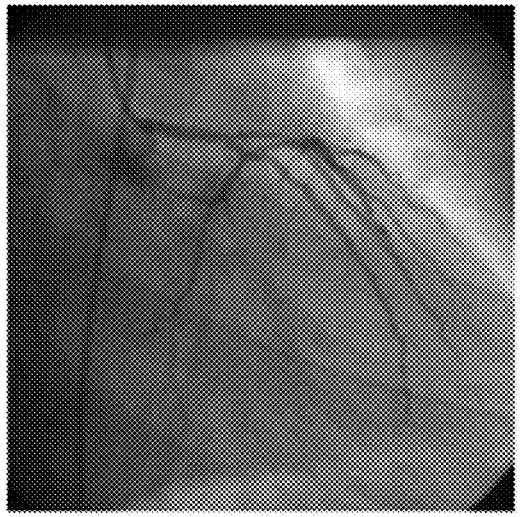
FIG. 2A depicts an unprocessed angiogram image in accordance with an embodiment.
Figure 2B:
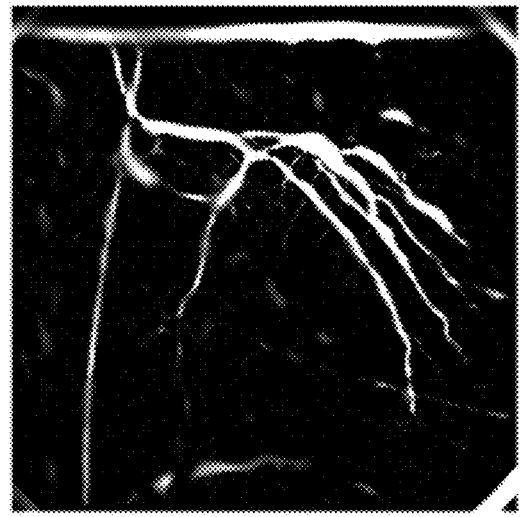
FIG. 2B depicts a Frangi feature filter result on the angiogram image shown in FIG. 2A in accordance with an embodiment.
Figure 2C:
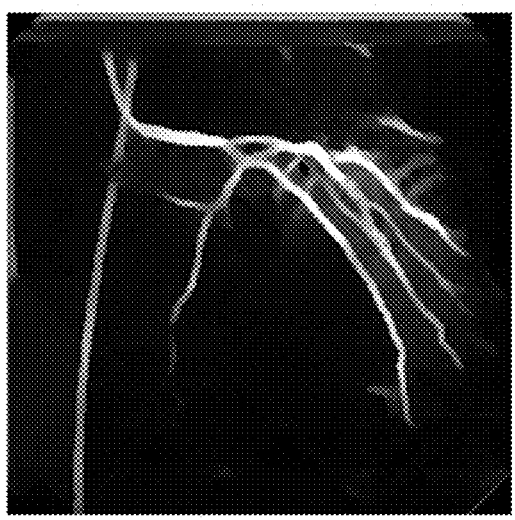
FIG. 2C depicts a Radon-like feature filter result on the angiogram image shown in FIG. 2A in accordance with an embodiment.
Figure 2D:
FIG. 2D depicts a Frangi-Radon feature filter result on the angiogram image shown in FIG. 2A in accordance with an embodiment.

Referring now to FIGS. 2A-2D a series of angiogram images are shown. FIG. 2A illustrates an example of an unprocessed angiogram image, FIG. 2B illustrates an example of a Frangi filter result on the angiogram image shown in FIG. 2A, FIG. 2C illustrates an example of a RFL filter on the angiogram image shown in FIG. 2A and FIG. 2D illustrates an example of a FRF filter on the angiogram image shown in FIG. 2A. As illustrated, the FRF filter is able to preserve the robustness property of the Radon-like feature (in terms of the outliers), it also accentuate those regions that is along the vessel region (the weak responses around vessels are suppressed from the RLF response).

In exemplary embodiments, the FRF filtering requires a geometric layout of the anatomic structures for it work well. Accordingly, an edge map or the delineations received from the top-down segmentation can be used as inputs into the FRF formulation. In addition, a good filtering output from FRF leads to a good initialization for the top-down segmentation. The process can therefore be executed alternatively to achieve the final segmentation.

In exemplary embodiments, the top-down segmentation model uses motion through active contours to segment blood vessels. In general, blood vessel motion can be used to identify blood vessels in angiogram video, as the vessel and its background exhibits different motion pattern within a sequence of angiogram frames. In exemplary embodiments, the motion information is incorporated into the levelset segmentation framework. The variational principle describing formulation of the vessel segmentation problem is given by:

$$\min E = E_g + \beta E_s + \lambda E_m \quad (2)$$

where $E_g$ is the so-called CURVES energy, which is a vessel segmentation functional based on Geodesic Active Contours (GAC) by replacing the mean curvature in GAC with the surface minimal curvature. $E_s$ is an anisotropic regularization term and $E_m$ is an added motion term. In exemplary embodiments, $E_m$ is given by:

$$E(M,\tilde{C}) = \int_\Omega (M-\mu)^2 dx + \alpha \oint_{\tilde{C}} ds \quad (3)$$

where, M is the motion magnitude image, $\Omega$ is the image domain and $\alpha$ is a regularization parameter on the curve length, $m=m_i$ if $x \in \hat{C}_{in}$ and $m=m_o$ if $x \in \hat{C}_{out}$. $\hat{C}_{in}$ and $\hat{C}_{out}$ denote the regions inside and outside of the vessel curve, $\alpha$, $\beta$, $\lambda$ are user defined constants that controls the weight of each term.

The motion field is estimated by treating each successive pairs of intensity image frames as surfaces (x, y, I (x, y)) and finding a deformable surface model that warps one frame into the next as described in the Demons algorithm. The resulting deformation field gives a consistent set of directional velocity vectors, sampling motion densely in both space and time. The minimization of the energy function in Equation (2) can be solved using the levelset framework, it is given by $$\frac{\partial \phi}{\partial t} = \left[ -(M-m_i)^2 + (M-m_o)^2 + \alpha \nabla \cdot \frac{\nabla \phi}{|\nabla \phi|} \right] |\nabla \phi| + F(\phi), \quad (4)$$

where $m_i$ and $m_o$ are the mean values inside and outside of the curve $\hat{C}$ in the motion magnitude image M, and $F(\phi)$ is the derived levelset evolution function from $E_s$ and $E_g$.

In exemplary embodiments, after each step of the curve evolution, the output is fed to RLF filter and the top-down segmentation and bottom-up filtering proceeds in alternative sequences. In exemplary embodiments, this iterative process stops when the zero front (corresponding to the vessel segmentation results) in levelset stops evolving, it indicates the convergence of the algorithm.

Figure 3:
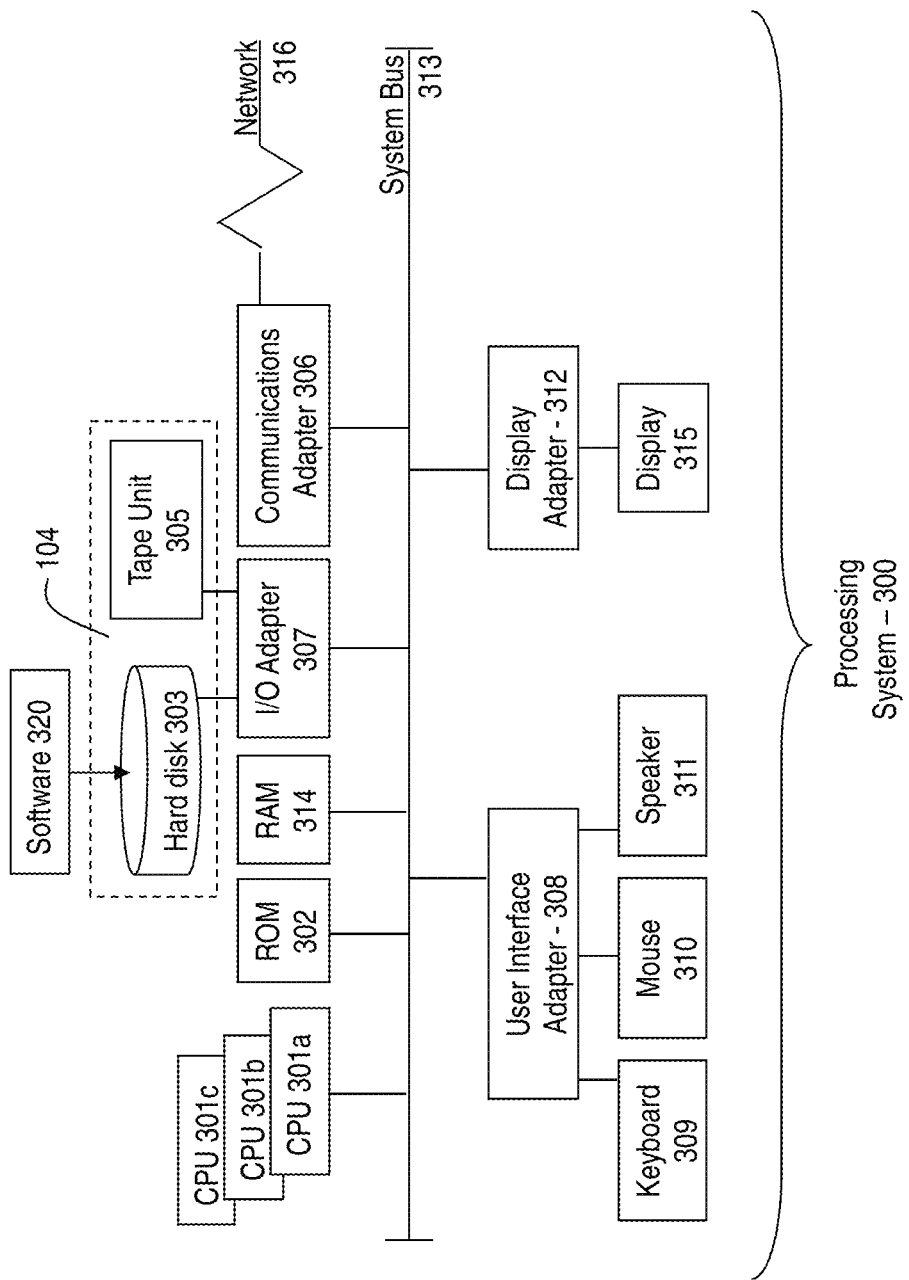
FIG. 3 depicts a processing system for practicing the teachings herein in accordance with an embodiment.

Referring to FIG. 3, there is shown an embodiment of a processing system 300 for implementing the teachings herein. In this embodiment, the system 300 has one or more central processing units (processors) 301*a*, 301*b*, 301*c*, etc. (collectively or generically referred to as processor(s) 301). In one embodiment, each processor 301 may include a reduced instruction set computer (RISC) microprocessor. Processors 301 are coupled to system memory 314 and various other components via a system bus 313. Read only memory (ROM) 302 is coupled to the system bus 313 and may include a basic input/output system (BIOS), which controls certain basic functions of system 300.

FIG. 3 further depicts an input/output (I/O) adapter 307 and a network adapter 306 coupled to the system bus 313. I/O adapter 307 may be a small computer system interface (SCSI) adapter that communicates with a hard disk 303 and/or tape storage drive 305 or any other similar component. I/O adapter 307, hard disk 303, and tape storage device 305 are collectively referred to herein as mass storage 304. Software 120 for execution on the processing system 300 may be stored in mass storage 304. A network adapter 306 interconnects bus 313 with an outside network 316 enabling data processing system 300 to communicate with other such systems. A screen (e.g., a display monitor) 315 is connected to system bus 313 by display adaptor 312, which may include a graphics adapter to improve the performance of graphics intensive applications and a video controller. In one embodiment, adapters 307, 306, and 312 may be connected to one or more I/O busses that are connected to system bus 313 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 313 via user interface adapter 308 and display adapter 312. A keyboard 309, mouse 130, and speaker 311 all interconnected to bus 313 via user interface adapter 308, which may include, for example, a Super I/O chip integrating multiple device adapters into a single integrated circuit.

Thus, as configured in FIG. 3, the system 300 includes processing capability in the form of processors 301, storage capability including system memory 314 and mass storage 304, input means such as keyboard 309 and mouse 130, and output capability including speaker 311 and display 315. In one embodiment, a portion of system memory 314 and mass storage 304 collectively store an operating system such as the AIX® operating system from IBM Corporation to coordinate the functions of the various components shown in FIG. 3.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for segmenting blood vessels comprising:
   receiving at least one angiogram frame;
   preprocessing, by a processor, the angiogram frame by applying a Butterworth bandpass filter to suppress high and low frequency background noise;
   performing bottom-up filtering of the preprocessed angiogram frame;
   performing top-down segmentation of the preprocessed angiogram frame based on the results of the bottom-up filtering;
   iteratively repeating the bottom-up filtering and the top-down segmentation until the difference between results of the top-down segmentation from consecutive iterations is equal to or below a threshold value;
   outputting the results of the top-down segmentation based on a determination that a difference between results of the top-down segmentation from consecutive iterations is below or equal to the threshold value.

2. The method of claim 1, wherein preprocessing the one or more angiogram frame comprises detecting one or more regions of interest.

3. The method of claim 2, wherein preprocessing the one or more angiogram frame comprises adaptive enhancement of the one or more regions of interest.

4. The method of claim 2, wherein preprocessing the one or more angiogram frame comprises removal of non-arterial shapes from the one or more regions of interest.

5. The method of claim 1, wherein performing bottom-up filtering comprises performing a Frangi-Radon feature filter on the one or more angiogram frame.

6. The method of claim 1, wherein the top-down segmentation model uses motion through active contours to segment blood vessels.

* * * * *